United States Patent [19]

Stockman

[11] 4,341,000
[45] Jul. 27, 1982

[54] METHOD OF CHARGING HEAT PIPE

[75] Inventor: Richard F. Stockman, Friendship, N.Y.

[73] Assignee: Combustion Engineering, Inc., Windsor, Conn.

[21] Appl. No.: 132,958

[22] Filed: Mar. 24, 1980

[51] Int. Cl.³ .................... B23P 15/26; F28D 15/00
[52] U.S. Cl. .................... 29/157.3 H; 165/104.27; 165/104.32
[58] Field of Search .................... 29/157.3 H, 157.3 R; 165/104.27, 104, 32

[56] References Cited

U.S. PATENT DOCUMENTS

| | | | |
|---|---|---|---|
| 1,711,804 | 5/1929 | Munters | 65/105 X |
| 2,350,348 | 6/1944 | Gaugler | 29/157.3 R |
| 3,114,414 | 12/1963 | Judd | 165/104.32 |
| 3,212,565 | 10/1965 | Esleeck | 165/104.27 |
| 3,363,675 | 1/1968 | Bierhoff | 165/104.27 |
| 3,874,439 | 4/1975 | Korshunov et al. | 165/104.32 |
| 4,061,187 | 12/1977 | Rajasekaran et al. | 165/104.32 |
| 4,240,189 | 12/1980 | Namiki | 29/157.3 R |
| 4,287,941 | 9/1981 | Allen | 165/104.32 |

FOREIGN PATENT DOCUMENTS 692122 8/1964 Canada .................... 165/104.32

Primary Examiner—Francis S. Husar
Assistant Examiner—V. Rising
Attorney, Agent, or Firm—William W. Habelt

[57] ABSTRACT

The method of effecting an evacuated space above a quantity of vaporizable fluid contained in a conventional heat pipe. A quantity of vaporizable fluid 10 is admitted into the heat pipe 12 through an inlet assembly to displace residual air in the heat pipe for exhaust through vent 24. When the heat pipe is full of fluid, the inlet assembly including valve 16 and fitting 24 is removed and coupling 26 plugged. Pump 26 having a suction connection to the heat pipe is actuated, and fluid is withdrawn from the heat pipe through check valve 18 leaving an evacuated space to form above a predetermined quantity of vaporizable fluid. A cylindrical standpipe 38 above check valve 18 precludes the evacuation of vaporizable fluid from said heat pipe lower than the upper rim of said standpipe.

3 Claims, 3 Drawing Figures

U.S. Patent      Jul. 27, 1982      4,341,000
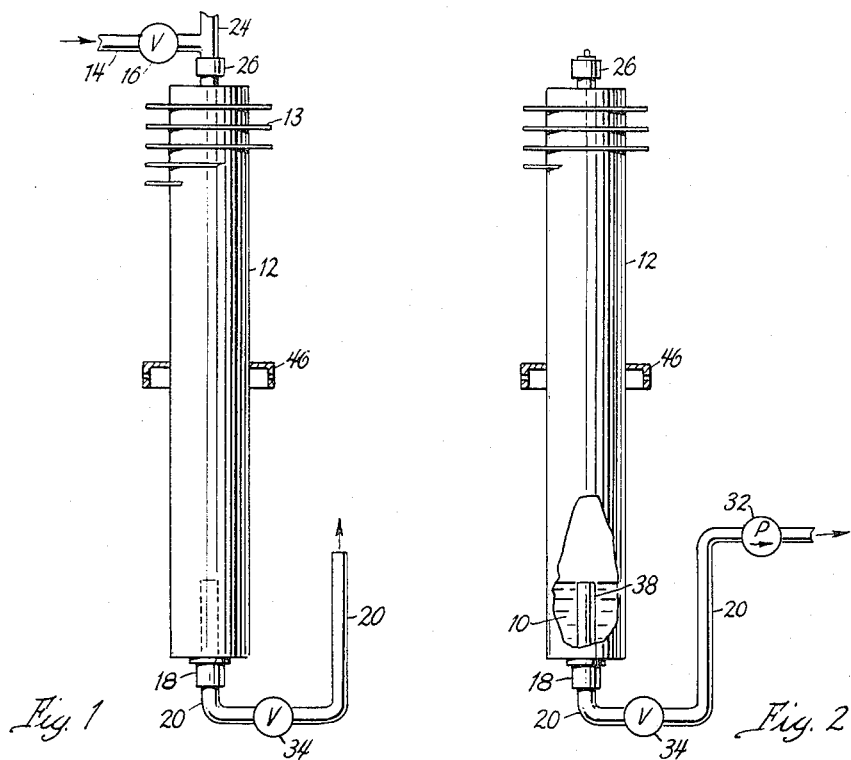
Fig. 1
Fig. 2
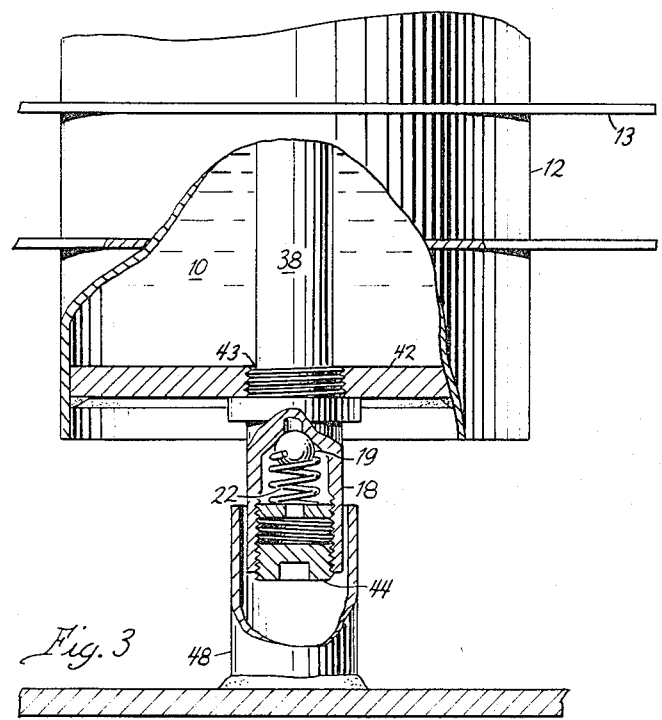
Fig. 3

METHOD OF CHARGING HEAT PIPE

BACKGROUND OF THE INVENTION

The present invention relates generally to a method of providing a heat pipe with an evacuated space above a quantity of vaporizable fluid. The invention provides specifically for a method of providing an evacuated space above a predetermined quantity of vaporizable fluid in a heat pipe to thus permit the optimum transfer of heat between opposite ends of the heat pipe by a continuous process of evaporation and condensation of the fluid. A novel feature of the invention provides for the supply of a predetermined quantity of fluid to a heat pipe whereby fluid may be added to or taken away from a reservoir of fluid in the heat pipe, or the fluid may be completely changed to provide for the specific heat transfer qualities required.

In known apparatus adapted to utilize heat pipes for the regenerative transfer of heat between hot and cold zones, the heat pipes are charged with a vaporizable fluid that is intended to be present for the life of the tube. There is no provision for changing or even adding fluid thereto to meet the requirements of a specific process.

U.S. Pat. No. 1,725,906 of Aug. 27, 1929, U.S. Pat. No. 2,746,725 of Mar. 22, 1956, and U.S. Pat. No. 4,183,399 of Jan. 15, 1980, are but examples of conventional heat pipe apparatus in which the heat pipes disclosed are standard tubular elements adapted to be supplied with a single charge of vaporizable fluid.

SUMMARY OF THE INVENTION

The present invention provides for a method of charging the individual heat pipes with a predetermined amount of vaporizable fluid. Moreover, this invention provides a method of completely removing one fluid and replacing it with a different amount of another vaporizable fluid to effect predetermined heat transfer characteristics in a conventional heat pipe.

BRIEF DESCRIPTION OF THE DRAWING

The particular method of operation will become apparent from the specification when viewed in conjunction with the accompanying drawing in which:

FIG. 1 is a schematic side elevation of a heat pipe arranged to receive a charging fluid, FIG. 2 is a schematic side elevation of a heat pipe, partially cut away to show an arrangement for selective evacuation, and FIG. 3 shows an enlarged side elevation of the lower end of a heat pipe, broken away to show the details necessary for selective evacuation.

DESCRIPTION OF THE PREFERRED EMBODIMENT

It has been recognized that heat transfer characteristics of a heat pipe may be adapted to prevailing conditions by the use of various vaporizable fluids, fluids that have different operating characteristics. Thus for example, the heat-transport capabilities and the useful temperature range of a heat pipe may be varied by the use of vaporizable fluids ranging from cryogenic liquids to liquid metals, with common refrigerants such as Freon, methanol, ammonia and water in between. Moreover, besides their various temperature ranges, each heat pipe using a different vaporizable fluid may have a unique heat-transport capability and an independent heat transfer rate that may be adapted to provide the desired heat transfer characteristics.

The present invention is directed to a method of charging a heat pipe with an evacuated space above a quantity of vaporizable fluid. The invention is moreover directed to a specific method of charging a heat pipe whereby a predetermined amount of fluid may be charged into a heat pipe, and it includes a method of changing fluids whereby one fluid in a heat pipe may be withdrawn and readily replaced by a different amount of fluid having different characteristics and a superposed evacuated space.

A heat pipe 12 having fins 13 secured thereto is adapted to provide for the transfer of heat between opposite ends thereof in the manner of a conventional heat pipe.

A quantity of vaporizable liquid 10 is supplied to the central chamber of the vertically disposed heat pipe 12 through inlet 14 and inlet valve 16 at the upper end thereof. A housing 18 enclosing check valve 19 in the outlet 20 at the bottom of the heat pipe 12 is held closed by spring 22 whereby the liquid is contained in the central cavity of the heat pipe. As liquid is admitted through inlet 14, air is exhausted from the heat pipe through an outlet at the top of fitting 24 until liquid fills the heat pipe.

After the interior chamber of the heat pipe 12 is completely full of liquid and all the air has been displaced therefrom, the "T" fitting 24 together with inlet valve 16 is removed from the heat pipe and coupling 26 plugged or capped to maintain the heat pipe completely full of liquid while sealed off at the upper end thereof.

A suction pump 32 is then connected to the outlet duct 20. Upon opening valve 34, the pump 32 is actuated to draw the liquid 10 out of heat tube 12 and exhaust it therefrom. The liquid 10 is exhausted from the interior chamber of heat pipe 12, past ball 19, to a level determined by the height of standpipe 38 above the outlet at the lower end of the heat tube. The standpipe 38 is threaded at 43 to closure 42 of the heat pipe whereby it may be removed and replaced by one of a length that provides a suitable depth of fluid in the heat pipe.

The standpipe 38 is accordingly threaded to 42 at 43 and covered with a suitable sealing flange that precludes fluid leakage therethrough.

After the heat pipe has been suitably exhausted to provide an evacuated space above a predetermined amount of vaporizable fluid, the valve 34 is closed, pipe 20 uncoupled below housing 18, and a valve plug 44 inserted into housing 18 to preclude fluid leakage into or out of the heat pipe. The heat pipe may then be freely moved and installed in a suitable division plate by means of a schematically shown annular flange 46, and the heat pipe may be held in a preferred upright position by means of a cylindrical bracket 44.

Inasmuch as the heat pipe is now sealed at both ends, it may be transported, stored or installed as desired, the operational characteristics being determined by the overall length of the standpipe and the characteristics of the fluid itself. If it should become apparent that different heat transfer characteristics are desired, the standpipe 38 and fluid 10 therein may be completely removed and replaced by other fluid and by a standpipe that would insure an optimum amount of the proper fluid in the heat pipe.

I claim:

1. The method of providing a heat pipe with an evacuated space above a vaporizable fluid comprising the steps of:
   a. supplying the heat pipe with an inlet at the upper end and a valved outlet at the lower end thereof,
   b. disposing an open-ended standpipe within said heat pipe at the lower end thereof, the standpipe connected at its lower end to said valved outlet and extending upwardly therefrom into the interior of the heat pipe,
   c. with said valved outlet closed, injecting a quantity of vaporizable fluid into the interior of said heat pipe through said inlet and withdrawing a quantity of air displaced by said fluid so as to completely fill the interior with the vaporizable fluid,
   d. closing the inlet to preclude the further passage of fluid therethrough, and
   e. with the interior of the heat pipe completely fluid and the inlet closed, opening said outlet valve and withdrawing therethrough a portion of the vaporizable fluid from the heat pipe to provide an evacuated space lying above the fluid that remains in the heat pipe, the fluid being withdrawn from the interior of the heat pipe through the standpipe connected to said valved outlet thereby precluding evacuation below the upper end of the standpipe.

2. The method of providing a heat pipe with an evacuated space above a vaporizable fluid as defined in claim 1 including the step of attching the suction side of a pump to the valved outlet at the bottom of said standpipe, and withdrawing fluid therethrough until fluid in the heat pipe reaches a level marked by the top of said standpipe.

3. The method of providing a heat pipe with an avacuated space above a vaporizable fluid as defined in claim 2 including the step of supplying a ball-check valve at the lower end of said heat pipe that is adapted to open to permit the exhaust of fluid from said heat pipe when the pump is actuated.

* * * * *

UNITED STATES PATENT AND TRADEMARK OFFICE
CERTIFICATE OF CORRECTION

PATENT NO. : 4,341,000
DATED : July 27, 1982
INVENTOR(S) : Richard F. Stockman

It is certified that error appears in the above—identified patent and that said Letters Patent is hereby corrected as shown below:

Cover page, Item 73, Assignee should be changed from "Combustion Engineering, Inc., Windsor, Conn." to --The Air Preheater Company, Inc., Wellsville, New York--

Signed and Sealed this

Ninth Day of November 1982

[SEAL]

Attest:

GERALD J. MOSSINGHOFF

Attesting Officer — Commissioner of Patents and Trademarks